Feb. 5, 1963  H. M. GILLERMAN  3,076,929
MEANS AND METHODS FOR ELECTRICALLY MEASURING
THE AMOUNT OF OXYGEN IN A GAS
Filed Aug. 21, 1959  2 Sheets-Sheet 2

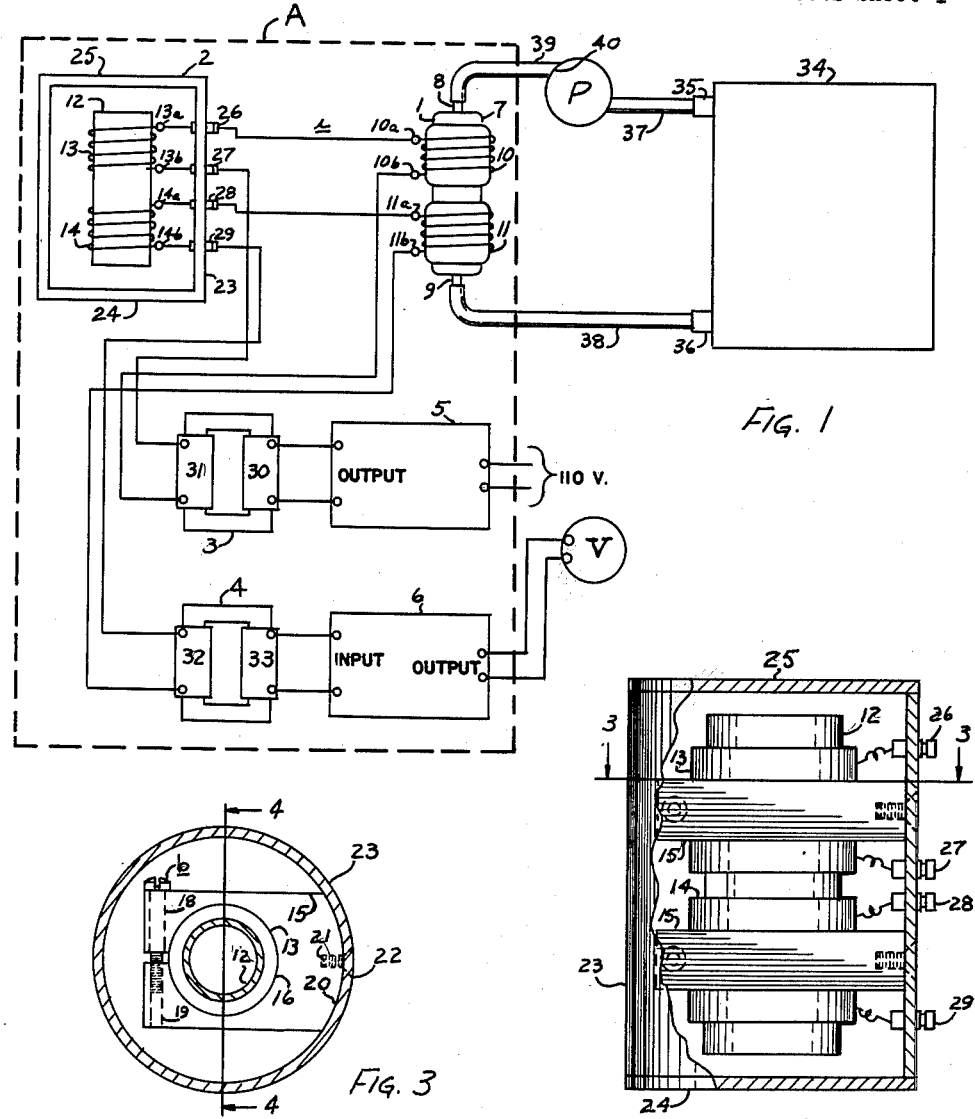

INVENTOR.
HARVEY M. GILLERMAN
BY
Alfred W. Petcheft
ATTORNEY

United States Patent Office 3,076,929
Patented Feb. 5, 1963

3,076,929
MEANS AND METHODS FOR ELECTRICALLY MEASURING THE AMOUNT OF OXYGEN IN A GAS
Harvey M. Gillerman, Olivette, Mo., assignor, by mesne assignments, to Shampaine Industries, Inc., St. Louis, Mo., a corporation of Missouri
Filed Aug. 21, 1959, Ser. No. 835,325
5 Claims. (Cl. 324—36)

This invention relates in general to means and methods for analyzing gases, and, more particularly, to means and methods for continuously measuring the percentage of oxygen in a gas.

It is the primary object of the present invention to provide means and methods for measuring oxygen content in a gas in a simple, direct, highly accurate manner.

It is another object of the present invention to provide an oxygen analyzer in which the electrical and mechanical components are not exposed to the gas, and, therefore, do not have to be periodically replaced.

It is a further object of the present invention to provide means and methods of the type stated wherein the measurement technique is entirely electrical, thus avoiding the disadvantages and errors inherent in a chemical and mechanical system of analysis.

It is also an object of the present invention to provide a method for measuring oxygen wherein the measurement is continuous and of a high order of accuracy.

It is a further object of the present invention to provide a method of oxygen analysis employing the change in inductance of a coil of known characteristics and measuring the changes in those characteristics which the paramagnetic properties of oxygen produce as the amount of oxygen within the coil is either increased or decreased.

It is an additional object of the present invention to provide means for analytically determining the oxygen content of a gas by measuring the changes in voltage induced in the secondary winding of transformer wound about a core containing the gas to be analyzed.

It is another object of the present invention to provide a method for measuring oxygen by inducing a voltage in the secondary winding of a transformer containing a core which includes the gas to be analyzed and comparing such voltage with a voltage induced in an identical transformer having for its core a material of known permeability.

With the above and other objects in view, my invention resides in the novel method and combinations presently described and pointed out in the claims.

Broadly speaking, the present invention resides in the discovery that a paramagnetic material such as oxygen, when used as a core material for a transformer, affects the inductance of said transformer and, correspondingly, affects the voltage induced in the secondary of this transformer. Moreover, when the oxygen concentration of a gas within a transformer core is varied, and the primary current and all other elements and factors of the transformer are kept constant, the voltage output of the secondary will vary in measurable relation to the variation in oxygen content. Such changes in voltage can be subtracted from a comparison voltage induced in the secondary of a second transformer containing a core of known paramagnetic properties, when the primaries of both transformers are connected in series so that the same current flows through said primaries. By this method the differences in voltage become of the order of a few parts per hundred and are significantly measurable to a relatively high degree of accuracy. Using the method of subtracting the voltages between the two transformers, it is possible accurately to measure the oxygen content in a gas by entirely electrical means, without requiring any sensory elements to be placed within the gas measuring chamber.

In the accompanying drawings—

FIG. 1 is a schematic view of an oxygen analyzer constructed in accordance with and embodying the present invention.

FIG. 2 is a side elevational view, partly broken away and in section, of the comparison transformer forming a part of the present invention;

FIG. 3 is a sectional view of the comparison transformer taken along line 3—3 of FIG. 2;

FIG. 4 is a sectional view of the comparison transformer taken along line 4—4 of FIG. 2;

Figure 7:
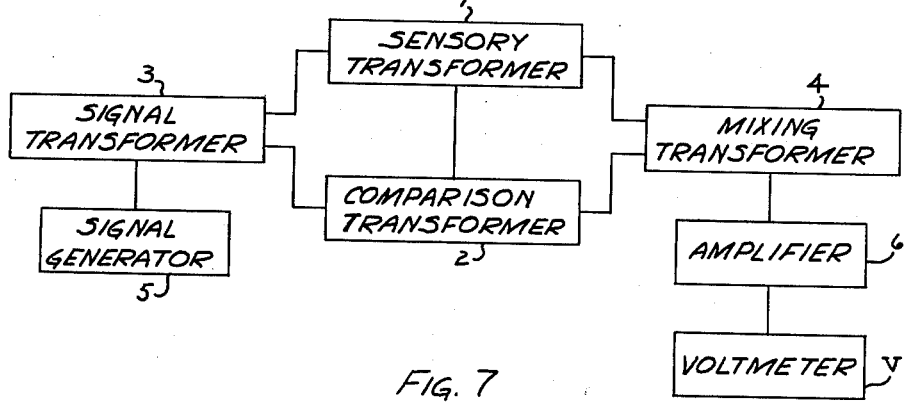
FIG. 7 is a schematic block-diagram of the analyzer.

Referring now in more detail and by reference characters to the drawings which illustrate a practical embodiment of the present invention, A designates an oxygen analyzer comprising a sensory transformer 1, a comparison transformer 2, a signal isolation transformer 3, a mixing transformer 4, a signal generator 5, and a high gain amplifier 6. The sensory transformer 1 consists of an elongated cylindrical glass tube 7 having a narrow-necked inlet 8 and a narrow-necked outlet 9. Wound around the glass tube 7 in axially spaced relation are coils 10 and 11 having an equal number of turns of wire terminated in terminals 10a, 10b, and 11b, respectively, thereby forming a transformer about glass tube 7. The sensory transformer 1 may be mechanically supported in any suitable or conventional manner.

The comparison transformer 2 comprises an open-ended cylindrical glass tube 12 of the same diametral size as the glass tube 7, transformer 2 having two axially spaced coils 13 and 14, said coils being identical to coils 10 and 11 of sensory transformer 1 and having end terminals 13a, 13b, 14a, and 14b, respectively. Provided for supporting the comparison transformer 2 are two dielectric brackets 15, formed preferably from polymerized resin, linear polyethylene or similar material and being provided at one end with apertures 16, through which the comparison transformer 2 is fitted. The brackets 15 are also provided with radial slots 17 extending from their outer margins into the apertures 16 and laterally extending axially aligned bores 18 and 19 for receiving clamping bolts $b$, thereby drawing the split ends of the bracket into secure clamping engagement around the comparison transformer 2. The brackets 15 are also provided at their outer ends with arcuate faces 20 having internally threaded apertures 21 for receiving attachment screws 22 which are adapted to draw the faces 20 tightly into flush-fitting engagement with a cylindrical metallic container 23 integrally provided with a flat-bottom wall 24 and a flat top 25, as shown in FIG. 2. Hermetically sealed in and extending through the walls of the metallic container 23 are feed-through terminals 26, 27, 28, and 29, respectively, connected to terminals 13a, 13b, 14a, and 14b, of the windings of comparison transformer 2.

The metallic container 23 is gas-tight and much larger in volume than the comparison transformer 2 so that the latter is entirely spaced from all parts of the container 23 and the free space within the container 23 is filled, at atmospheric pressure, with a gas of known paramagnetic properties, said gas being preferably, though not necessarily nitrogen. This gas should be selected to achieve a core permeability of unity within the comparison transformer 2, and the metallic container is necessary to exclude any mutual interference from nearby extraneous inductive fields such as those fields provided by signal isolation transformer 3, the mixing transformer 4, or the sensory transformer 1.

A gas of unity permeability may be achieved by mixing a gas with a negative volume-susceptibility with gas of positive volume-susceptibility in such proportion that the total of volume-susceptibility equals zero when the gases are combined. By way of example, and not by way of limitation, unity permeability may be achieved in the following manner:

*Example I*
(By volume)

| | Percent |
|---|---|
| $NO_2$ | 8 |
| $CO_2$ | 92 |

*Example II*
(By volume)

| | |
|---|---|
| $CO_2$ | 99 |
| $O_2$ | 1 |

When the nitrogen is placed in the metallic container 23, permeability is not exactly unity, but, it is so close (.999999) that the deviation of one part of a million will not appreciably affect the accuracy of the measuring network.

The signal isolation transformer 3 and the mixing transformer 4 are both conventional transformers, the structural details of which are not part of the present invention, and are, hence, not specifically described herein. It is merely sufficient for present purposes to note that signal isolation transformer 3 includes a primary 30 and a secondary 31 and mixing transformer 4 includes a primary 32 and a secondary 33.

The signal generator 5 is preferably, though not necessarily, a multi-vibrator of any suitable or conventional design and is likewise not specifically described herein. It is sufficient for present purposes to point out that the signal generator 5 provides an alternating current output signal to primary 30 of signal isolation transformer 3.

The high-gain amplifier 6 is also a conventional amplifier, the structural details of which are not a part of the present invention, and are, hence, not specifically described herein. It is sufficient for present purposes to state that the high-gain amplifier 6 functions to amplify the output from the mixing transformer 4 so that it may be read on voltmeter V.

In use, a gaseous mixture containing oxygen is passed through glass tube 7 of sensory transformer 1. As an example and not by way of limitation, FIG. 1 depicts a means for routing the gas through sensory transformer 1. The oxygen analyzer A may be used in conjunction with an oxygen tent 34 from which a sample may be continuously or intermittently withdrawn. The oxygen tent 34 is provided with outlet and inlet ports 35 and 36 to which hoses 37 and 38 are conventionally coupled. The hose 37 is connected at its other end to a pump P having a second hose 39 attached on its outlet side 40. The other end of the hose 39 is attached to the inlet neck 8 of the sensory transformer 1. Similarly, the other end of hose 38 is coupled to the outlet neck 9 of the sensory transformer 1. In use, the pump P continuously withdraws a sample of the air from within the oxygen tent 34 and passes it through sensory transformer 1 back into oxygen tent 34.

Figure 8:
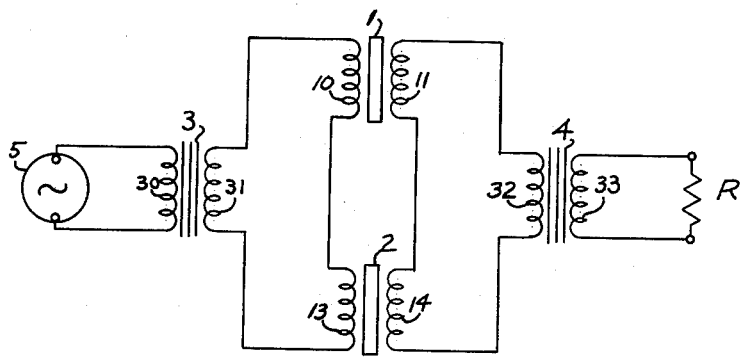
FIG. 8 is a schematic electrical circuit diagram of the present invention.
Figures 5, 6:
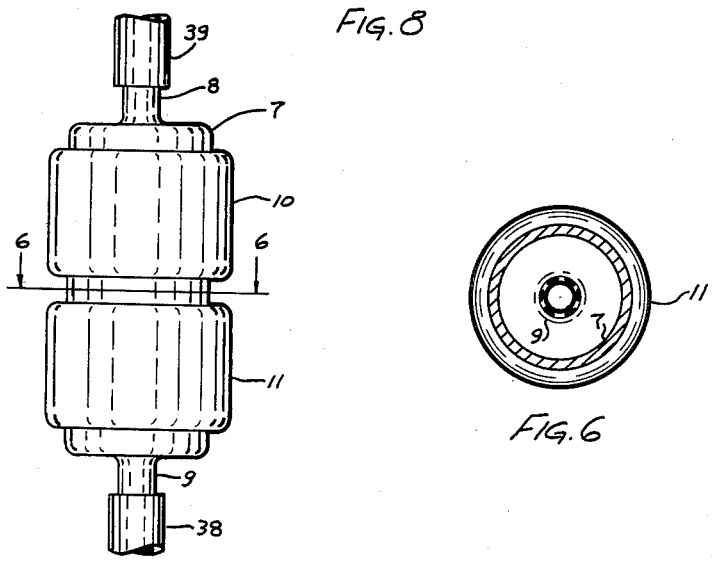
FIG. 5 is a side elevational view of the sensory transformer forming a part of the present invention.
FIG. 6 is a transverse sectional view of the sensory transformer taken along line 6—6 of FIG. 5.

The electrical components of the oxygen analyzer A are electrically connected, as shown in FIG. 8. Coils 13 and 10 are connected in series across the secondary 31 of signal isolation transformer 3 as follows: terminals 13a and 10a are connected together and terminals 13b and 10b are connected across the output terminals of secondary 31. It should be noted that the terminal 10b or 13b may be connected to either end of secondary 31 inasmuch as the series connection is necessary only to cause the same current to flow through the primaries 10 and 13 at the same time. The secondaries 11 and 14 of the sensory transformer 1 and comparison transformer 2 have their terminals 11a and 14a connected together so that the voltage across the terminals 14b and 11b represents the difference between the voltage induced in coil 11 and the voltage induced in coil 14. This difference voltage is applied to primary 32 of mixing transformer 4 by electrically connecting terminals 14b and 11b to primary 32. Secondary 33 of mixing transformer 4 is electrically connected to input terminal of high-gain amplifier 6. Finally, the output terminals of high-gain amplifier 6 are connected to the voltmeter V.

The circuit operates in the following manner. Signal generator 5 is directly coupled to primary 30 of signal isolation transformer 3 which provides an alternating current voltage to secondary 31 causing a current $i$ to flow through primaries 10 and 13 of transformers 1 and 2, the two primaries being connected in series. This current $i$ correspondingly causes voltage to be induced in the secondaries 11 and 14, said secondary voltages being proportional to the voltage drops across primaries 10 and 13, respectively. As previously stated, the transformers 1 and 2 are identical in every respect except for the core material. Therefore, the difference in voltage across primaries 10 and 13, and the corresponding difference between the voltages induced across secondaries 11 and 14 is due solely to the difference in the gas which comprises the core. The voltage dropped across an inductive winding having one core material in series with a second identical inductive winding having a different core material is a direct function of the permeability of the two core materials. Permeability may be defined as "unity plus some constant multiplied by the volume-susceptibility of the core material." Because the gas in the comparison transformer was chosen to yield an effective volume-susceptibility of zero, the permeability of the core of the comparison transformer is unity. The difference between the voltages across secondaries 11 and 14 is a direct indication of the volume-susceptibility of the gas in the core of the sensory transformer 1, which is, in turn, an indication of the amount of oxygen present in the gas being analyzed. Inasmuch as oxygen has a paramagnetism far greater than that of other known gases, this becomes a highly discriminatory property and it is, therefore, possible to obtain very precise analytical results. Incidentally, this is one of the advantages of the present invention, since all oxygen analyzing equipment is subject to errors resulting from contaminant gases, and the equipment of the present invention is relatively unaffected by such contaminants so that any errors resulting therefrom are comparatively slight.

The difference between the voltages impressed on the secondaries 11 and 14 is measured in the following manner. Secondaries 11 and 14 are connected in series in such manner that the voltage across secondary 11, as read from the common connection, is in phase opposition to the voltage of secondary 14 as read away from the common connection; in other words, the voltage read across the open ends of secondaries 11 and 14 represents the difference between the voltages induced in the two windings. The open ends of secondaries 11 and 14 are connected to the primaries 32 of mixing transformer 4.

In practice, it is preferred that the mixing transformer 4 have a step-up ratio of between 2:1 and 1:1, the mixing transformer being necessary only to isolate secondaries 11 and 14 from the common ground. The secondary 33 of mixing transformer 4 is connected to the input of amplifier 6 which preferably has a large grid resistor R across its input. R should be of a relatively high impedance with respect to the other components in the circuit as this impedance will be reflected back into the circuit of secondaries 11 and 14 and, correspondingly, back into the primaries 10 and 13. Because resistance R is large with respect to the impedance of the other components, the magnitude of current $i$ will not change appreciably as the amount of oxygen in the sensory core varies from zero to 100%, the variation in current being of the order of a few hundred parts per million, with the circuit connected as described in FIGS. 7 and 8. The voltage impressed across resistor R is a direct representation of the amount of oxygen in the gas to be analyzed, the variation being almost perfectly linear as the oxygen content is either increased or decreased. In practice, it has been found that in the circuit described, the output voltage for 100% of oxygen is several hundred micromicrovolts. Since the amplifier 6 has been chosen to have a high-gain, and a dynamic range sufficient to prevent signal saturation as the input voltage varies from zero to several hundred micromicrovolts, the output voltage becomes a value which is readable on almost all commercial meters such as voltmeter V. Moreover, the voltmeter V may have a dial face especially calibrated in terms of the percent of oxygen. It is to be noted that this equipment is to operate with alternating current energy supplied by signal generator 5. No specified frequency is necessary for the analyzer to function properly. As the frequency increases, the size of the sensory transformer and comparison transformer required to get a given response necessarily decreases.

It is to be further noted that a compact oxygen analyzer may be produced merely by combining a sensory transformer 1, a comparison transformer 2, a signal isolation transformer 3, a mixing transformer 4, a signal generator 5 and high-gain amplifier 6 in a cabinet providing the necessary electrical connections as described in the drawings, and providing sufficient gas inlets and outlets also as described in the specification.

It should be understood that changes in the modification in the form, construction, arrangement, and combinations of parts of the equipment may be made and substituted for those herein shown and described without departing from the nature and principle of my invention.

Having thus described my invention, what I claim and desire to secure by Letters Patent is:

1. An instrument for analyzing a gaseous medium to determine the concentration of oxygen therein, said instrument comprising a first glass tube through which the gas to be analyzed can flow continuously, first and second coils wound in axially spaced relation about said tube, a second glass tube mounted within a closed container which is filled with a gas of known magnetic permeability, said second tube being in open communication at its opposite end to the interior of the container so that the interior of the second tube is filled with the same gas as that which occupies the interior of the container, third and fourth coils wound in axially spaced relation upon the second tube, said first, second, third, and fourth coils all having identical numbers of turns, a signal generator, a signal isolation transformer having its primary connected to the output side of the signal generator and its secondary connected in series with the first and third coils, a mixing transformer having its primary connected in series with the second and fourth coils, its secondary connected to the input side of a high-gain amplifier, and indicator means operatively connected to the output side of the high-gain amplifier.

2. An instrument for analyzing a gaseous medium to determine the concentration of oxygen therein, said instrument comprising a first glass tube, said first glass tube being provided at its opposite ends respectively with a narrow-necked inlet and a narrow-necked outlet through which the gas to be analyzed can enter and leave said first glass tube, first and second coils wound in axially spaced relation about said tube, a second glass tube mounted within a closed container which is filled with a gas of known magnetic permeability, said second tube being in open communication at its opposite end to the interior of the container so that the interior of the second tube is filled with the same gas as that which occupies the interior of the container, third and fourth coils wound in axially spaced relation upon the second tube, said first, second, third, and fourth coils all having identical numbers of turns, a signal generator, a signal isolation transformer having its primary connected to the output side of the signal generator and its secondary connected in series with the first and third coils, a mixing transformer having its primary connected in series with the second and fourth coils, its secondary connected to the input side of a high-gain amplifier, and indicator means operatively connected to the output side of the high-gain amplifier.

3. An instrument for analyzing a gaseous medium to determine the concentration of oxygen therein, said instrument comprising a first glass tube through which the gas to be analyzed can flow continuously, first and second coils wound in axially spaced relation about said tube, a second glass tube mounted within a closed container which is filled with nitrogen, said second tube being in open communication at its opposite end to the interior of the container so that the interior of the second tube is filled with nitrogen, third and fourth coils wound in axially spaced relation upon the second tube, said first, second, third, and fourth coils all having identical numbers of turns, a signal generator, a signal isolation transformer having its primary connected to the output side of the signal generator and its secondary connected in series with the first and third coils, a mixing transformer having its primary connected in series with the second and fourth coils, its secondary connected to the input side of a high-gain amplifier, and indicator means operatively connected to the output side of the high-gain amplifier.

4. The instrument of claim 2 wherein the indicator means consists of a voltmeter operatively connected to the input side of the high-gain amplifier.

5. An instrument for analyzing a gaseous medium to determine the concentration of oxygen therein, said instrument comprising a first glass tube, said first glass tube being provided at its opposite ends respectively with a narrow-necked inlet and a narrow-necked outlet through which the gas to be analyzed can enter and leave said first glass tube, first and second coils wound in axially spaced relation about said tube, a second glass tube mounted within a closed container which is filled with a gas of known magnetic permeability, said second tube being in open communication at its opposite end to the interior of the container so that the interior of the second tube is filled with the same gas as that which occupies the interior of the container, third and fourth coils wound in axially spaced relation upon the second tube, said first, second, third, and fourth coils all having identical numbers of turns, a signal generator, a signal isolation transformer having its primary connected to the output side of the signal generator and its secondary connected in series with the first and third coils, a mixing transformer having its primary connected in series with the second and fourth coils, its secondary connected to the input side of a high-gain amplifier, and indicator means operatively connected to the output side of the high-gain amplifier, said high-gain amplifier having a large grid resistor across its input, said resistor having a high impedance with respect to the other components in the circuit.

References Cited in the file of this patent

UNITED STATES PATENTS

| | | |
|---|---|---|
| 2,010,189 | Hallowell | Aug. 6, 1935 |
| 2,102,450 | Zuschlag | Dec. 14, 1937 |
| 2,405,137 | Gale et al. | Aug. 6, 1946 |
| 2,689,332 | Greene | Sept. 14, 1954 |
| 2,930,970 | Vollmer | Mar. 29, 1960 |